United States Patent [19]
Sakano et al.

[11] 3,906,622
[45] Sept. 23, 1975

[54] METHOD OF MANUFACTURING WINDING TYPE FLAT MOTOR ARMATURES

[75] Inventors: Tomiaki Sakano, Hirakata; Naoji Takeda, Osaka, both of Japan

[73] Assignee: Matsushita Electric Industrial Co., Ltd., Kadoma, Japan

[22] Filed: Nov. 30, 1973

[21] Appl. No.: 420,600

[30] Foreign Application Priority Data
Dec. 4, 1972   Japan................ 47-122248

[52] U.S. Cl. ............ 29/597; 29/598; 264/272; 310/43; 310/237; 310/268
[51] Int. Cl.² .................................. H02K 15/04
[58] Field of Search ...... 29/598, 597, 605; 264/272; 310/266, 268, 237, 43

[56] References Cited
UNITED STATES PATENTS

| | | |
|---|---|---|
| 2,759,116 | 8/1956 | Glass ............................ 310/266 |
| 3,212,170 | 10/1965 | Marshall ........................ 29/598 |
| 3,239,598 | 3/1966 | Olson et al. .................. 29/605 UX |
| 3,488,837 | 1/1970 | Massouda et al. ............ 29/598 |
| 3,524,250 | 8/1970 | Burr ............................... 29/598 X |
| 3,599,325 | 8/1971 | Burr et al. ..................... 29/597 |

*Primary Examiner*—Carl E. Hall
*Attorney, Agent, or Firm*—Stevens, Davis, Miller & Mosher

[57] ABSTRACT

A method of manufacturing the armature for a winding type flat motor comprising the steps of forming an armature coil by stacking a plurality of unit coils each consisting of a bundle of a plurality of wires, covering the surface of the armature coil thus formed with a semi-cured resin impregnated cloth, setting the resultant armature coil in a mold, and molding the same with a resin.

7 Claims, 5 Drawing Figures

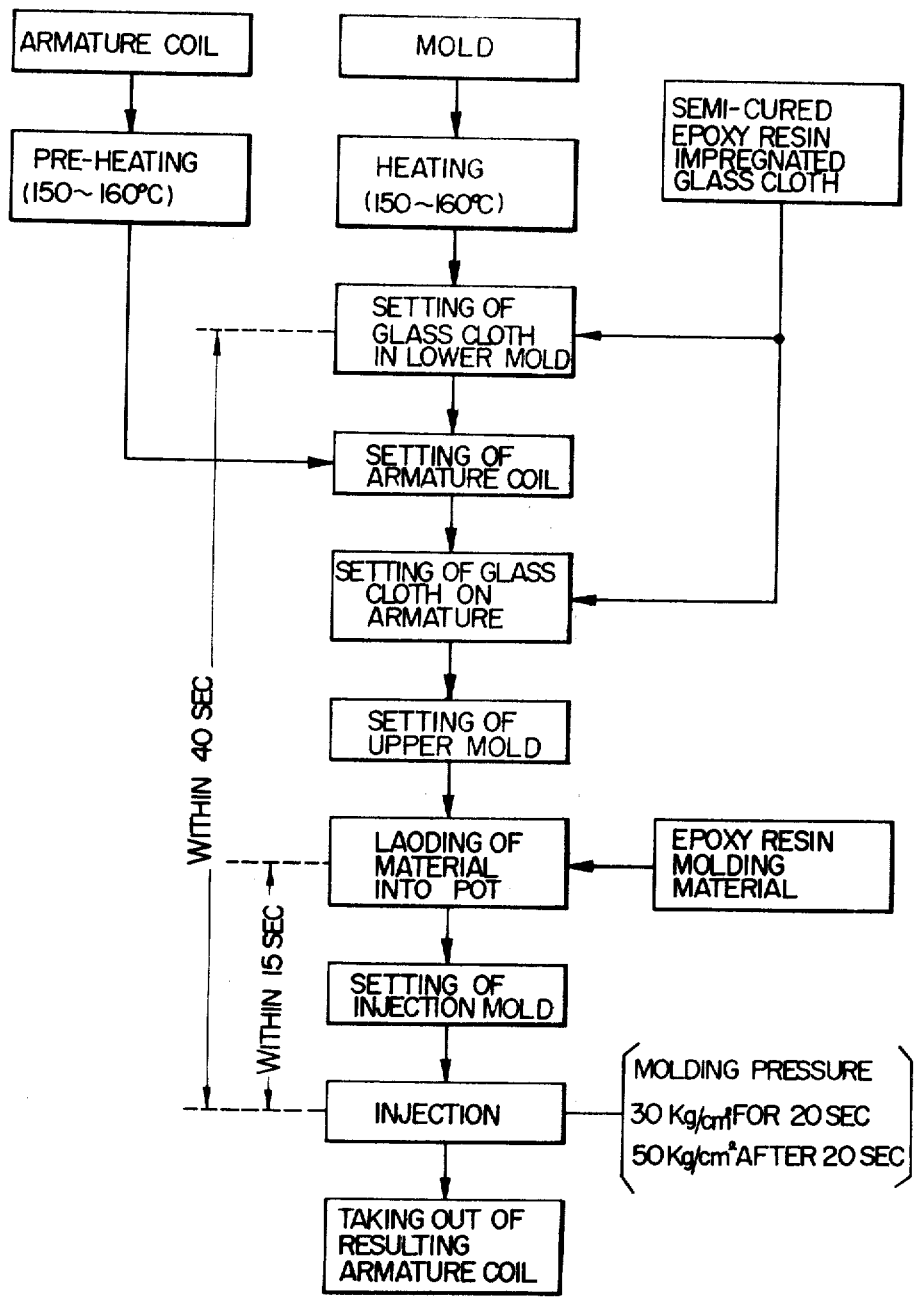

METHOD OF MANUFACTURING WINDING TYPE FLAT MOTOR ARMATURES

Heretofore, armatures for winding type flat motors have been manufactured without using any resin impregnated cloth in the molding process. Therefore, during the resin molding process the gaps between adjacent unit coils constituting the armature coil are likely to be disturbed causing deformation of the armature coil. With an armature obtained in this way, satisfactory performance of the motor incorporating it cannot be expected. Besides, the wires forming the resin-molded armature coil are partly exposed outwardly so that the ultimate strength against high speed revolution is inferior. To prevent deformation of the armature coil at the time of the resin molding, various measures, such as reducing the resin molding pressure, reducing the resin injecting speed or forming a ring-like resin injecting gate, have been contemplated, but satisfactory results could not be obtained with any of these measures.

As a further measure, a heat-resistant polyamide sheet has been tried, the sheet being laid in the molding process on the armature coil over a portion thereof extending below the resin injecting gates so as to promote the distribution of the discharged resin. By so doing, the deformation of the armature coil could be prevented. However, the heat-resiting polyamide sheet laid over the armature coil would not adhere to the armature coil and molding resin. Therefore, the resultant armature could not fully withstand high speed revolution.

This invention seeks to provide an armature for winding type flat motors, which can overcome the above drawbacks, and an object of the invention is to prevent the deformaation of the armature coil due to the injection of molding material during the molding process and improve the adhesion between the coil and molding material.

The armature for winding type flat motors manufactured by the method according to the invention has the following features:

First, since the armature coil is preliminarily shaped and unified by heating, its handling can be facilitated and coil terminal treatment can be made prior to the resin molding process.

Second, deformation or displacement of the armature coil or unit coils due to the injection of molding material during the molding process can be prevented.

Third, by use of a semi-cured resin impregnated cloth over the surface of the armature coil it is possible to uniformly distribute the molding pressure below the injection gates, that is, uniformly distribute the molding material in the cloth and armature coil, which aids in preventing deformation of the armature coil.

Fourth, since the flat portion of the armature winding is completely covered with the cloth covering, the adhesion between the coil and molding material can be improved due to mixing of the molding material with the semi-cured resin closely impregnated in the cloth, so that the mechanical strength and moisture-proof property of the armature can be improved.

The above and other objects, features and advantages of the invention will become more apparent from the following description having reference to the accompanying drawings, in which:

FIG. 5 shows the outline of the process for molding the armature coil according to the invention.

The invention will now be described with reference to the accompanying drawing.

Figure 1:
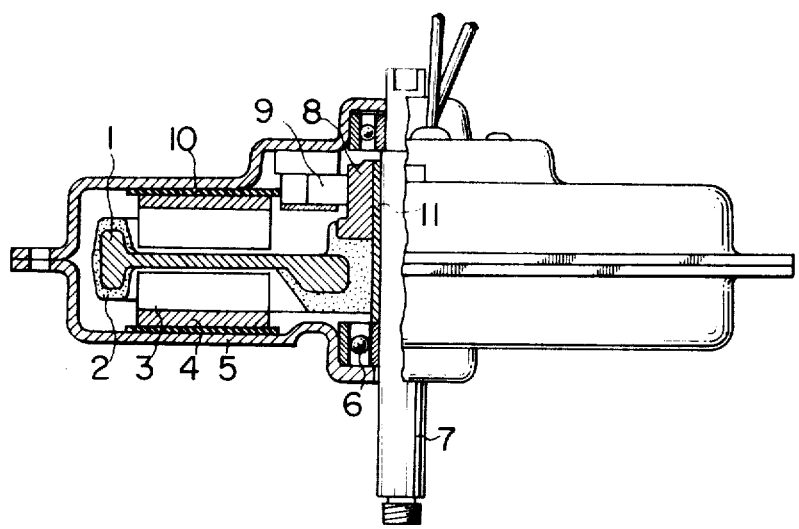
FIG. 1 is a sectional view of a winding type flat motor having an armature obtained by the method according to the invention.

FIG. 1 shows a winding type flat motor having an armature obtained according to the invention. In the Figure, numeral 1 designates an armature coil, numeral 2 molding material, numeral 3 a permanent magnet, numeral 4 an iron plate, numeral 5 a frame, numeral 6 bearings, numeral 7 a shaft, numeral 8 a commutator, numeral 9 a brush, numeral 10 an insulator, and numeral 11 a bushing.

Figure 2:
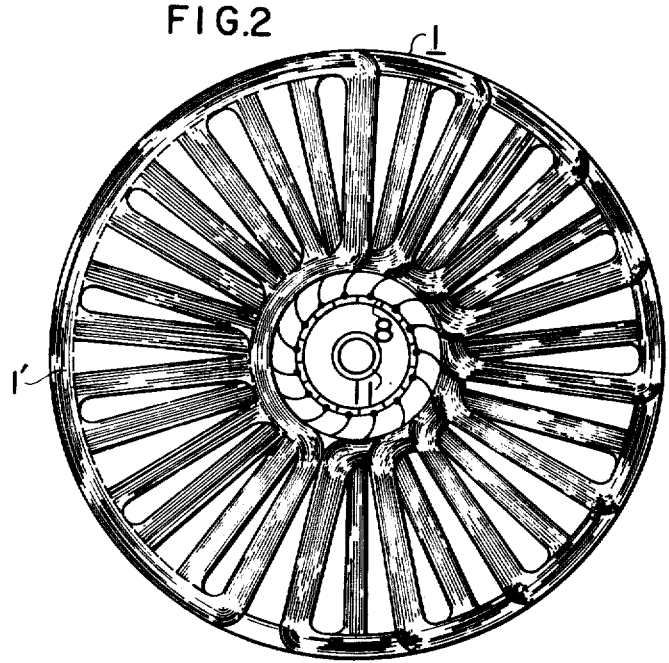
FIG. 2 is a plan view showing the armature winding of the same armature.

FIG. 2 shows an example of the armature coil comprising a stack of unit coils 1'. The armature coil of this structure is usually molded by resin compound in order that the armature can fulfil the function of the rotor. However, because of the flat structure of the armature coil consisting of comparatively small size wires, special measures have been required in its manufacture in order to obtain increased mass productivity and obtain an armature structure capable of withstanding high speed at high temperature.

This invention provides a method of manufacturing armature windings which can meet the above requirements.

The invention will now be described in conjunction with an embodiment of the method.

The unit coils 1' are made of thermosetting resin type self bonding wires, and they are held at a temperature of 180°C to 200°C for several minutes by electrical resistance heating.

For forming the armature coil the unit coils 1' are set in a mold having a predetermined configuration and are held in that stage for several minutes to perfectly shape and unify them. Then, the coil terminals are connected to the commutator 8 to obtain armature coil 1 as shown in FIG. 2. This armature coil is subjected to a pot type transfer molding.

Figure 3:
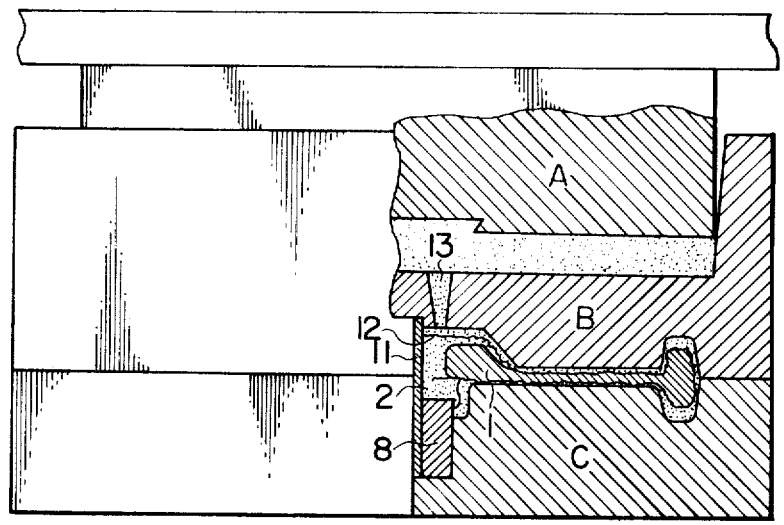
FIG. 3 is a fragmentary sectional view showing an apparatus for carrying out the method according to the invention.
Figure 4:
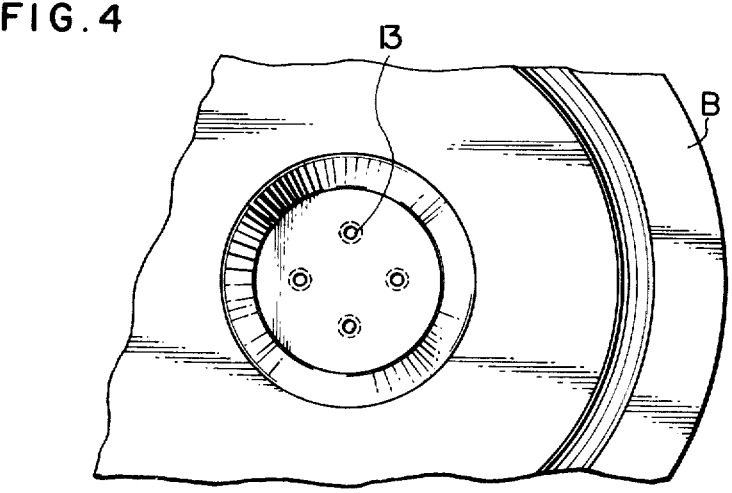
FIG. 4 is a fragmentary plan view showing an upper mold half in the same apparatus.

FIG. 3 shows the specific apparatus for carrying out the molding process. In the Figure, reference character A designates a mold, character B an upper mold half, and character C a lower mold half. Numeral 12 designates the semi-cured resin impregnated cloth featured by the invention. It is provided in such a way as to cover the surface of the armature coil 1. Numeral 13 designates molding material discharge or injection gates of the upper mold half 13. They are provided at positions clearly shown in FIG. 4.

The molding process is carried out in the way shown in FIG. 5. In the instant embodiment, semi-cured epoxy resin impregnated glass cloth is used as the semi-cured resin impregnated cloth 12, and epoxy resin is used as the molding material 2.

In the process shown in FIG. 5, the semi-cured resin impregnated cloth 12 serves to distribute the pressure of the injected resin under the injection gates 13 and also sufficiently cover the flat portion of the armature coil 1 where the wires are exposed outwardly. Thus, it can make up for insufficient bonding between molding material 2 and wires to increase the mechanical strength and improve the moisture-proof property. Also, the injected resin penetrates the cloth 12 to reach the space or void between cloth 12 and armature winding 1 and fill all interstices in the armature coil, so that the coil structure can be effectively reinforced. For effectively obtaining this reinforcement, the semi-cured resin impregnated in the semi-cured resin impregnating cloth is preferably the same resin as the molding material. Thus, in case of using epoxy resin impregnated cloth, epoxy resin molding material is superior to phenol resin molding material. Further, a perfect unitary structure may be obtained by injecting the molding material during the period when the semi-cured resin impregnated to the cloth still retains fluidity and tackiness. Still further, the cloth 12 is not limited to glass cloth, but other cloths of synthetic resin yarn, for instance "Tetrone" (a tradename), and natural yarn may be used as well depending upon the heat resistance of the armature. Furthermore, by covering only part of the armature winding 1, namely the part that extends directly below the injection gates 13, with the semi-cured resin impregnated cloth, the afore-mentioned effect of distribution of the pressure of the injected resin may be achieved to a certain extent.

The self-bonding magnet wires used here are required to have sufficient bonding strength at high temperature resistance lest they shoulld be disassembled or displaced due to the high temperature at the time of molding under the pressure of the injected molding material. Also, in place of using such self-bonding magnet wires it is possible to mold ordinary wires with varnishes.

We claim:

1. A method of manufacturing an armature coil for a winding type flat motor comprising the steps of
    stacking a plurality of unit coils in layers to form an armature coil, each of said unit coils consisting of a plurality of turns of wire,
    preliminarily shaping said armature coil,
    covering said preliminarily shaped armature coil with a semi-cured resin impregnated cloth,
    placing said covered armature coil in a mold, and
    introducing a molding resin into said mold for molding said armature coil.

2. A method of manufacturing an armature coil for a winding type flat motor comprising
    forming a plurality of unit coils each having two ends and comprising a plurality of turns of wire, the wire having a thermosetting resin coating for self-bonding,
    pre-heating said unit coils,
    setting said pre-heated unit coils in a mold having a predetermined configuration,
    connecting the ends of the unit coils to a commutator to thereby form an armature coil,
    covering the surface of said armature coil with a semi-cured resin impregnated cloth, and
    introducing a molding material into said mold for molding said armature coil.

3. The method defined by claim 2 wherein the pre-heating of said armature coils is effected at a temperature in the range 150°C – 160°C.

4. The method defined by claim 2 wherein said molding material is injected into said mold at a pressure of about 30 kg/cm² for 20 seconds and 50 kg/cm² thereafter.

5. The method defined by claim 4 wherein the interval between covering the surface of the armature coil with said semicured resin impregnated cloth and injecting a molding material into said mold is about 40 seconds, said molding material being injected during the period when said semi-cured resin retains fluidity and tackiness.

6. The method defined by claim 2 wherein said molding material comprises the same resin as the resin in said resin impregnated cloth.

7. The method defined by claim 5 wherein said resin is epoxy resin.

* * * * *